J. L. PRATHER.
PLOW.
APPLICATION FILED SEPT. 7, 1909.
1,008,490.
Patented Nov. 14, 1911.
2 SHEETS—SHEET 1.
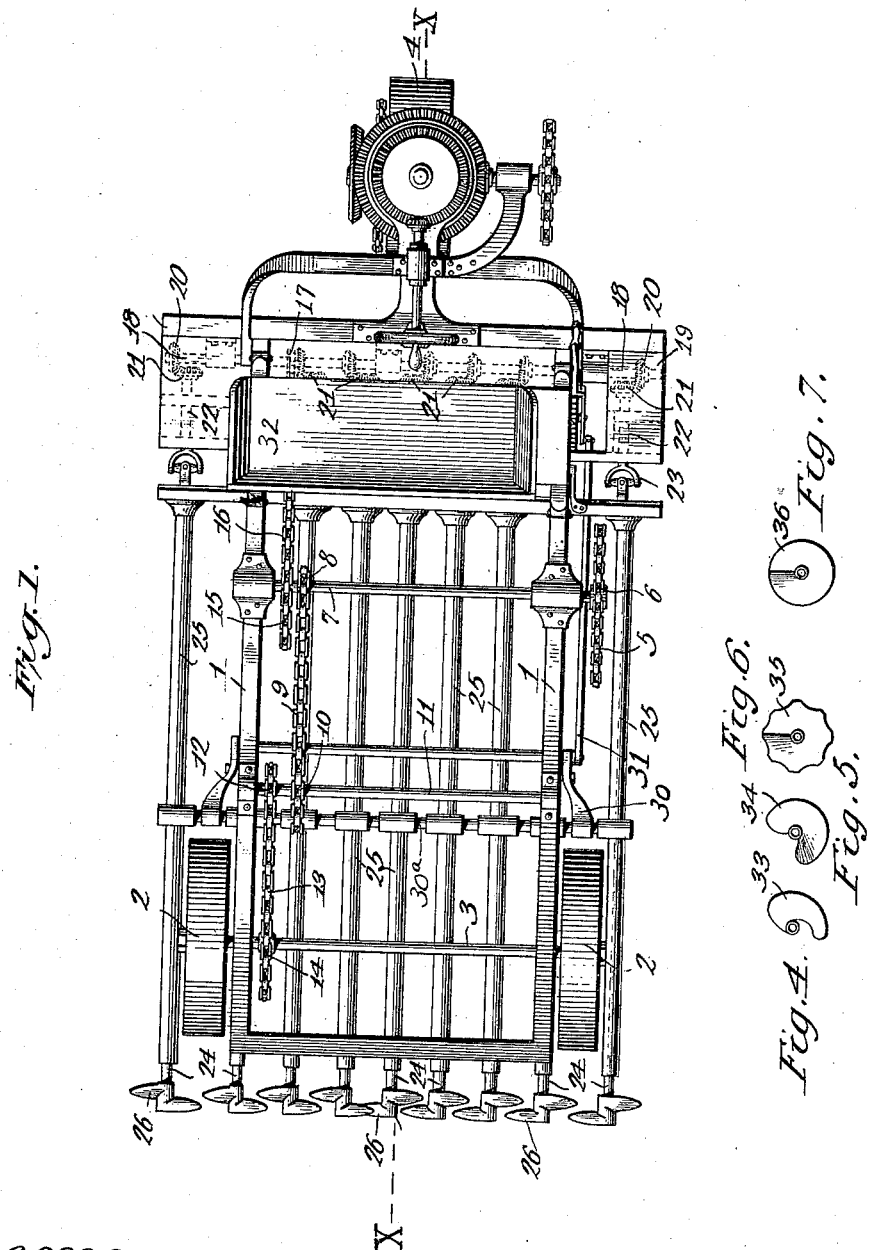
Witnesses:
W. L. Collins
D. L. Prather
Inventor:
Joseph L. Prather

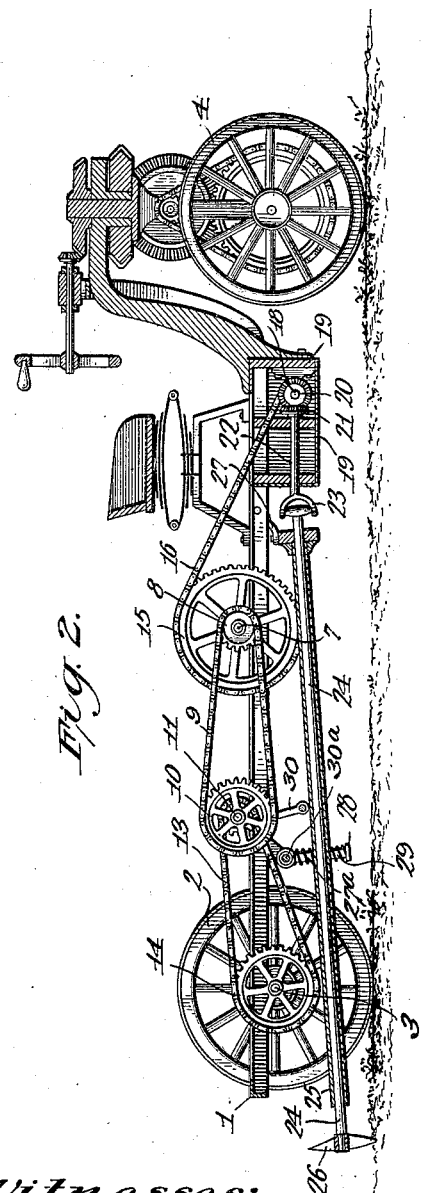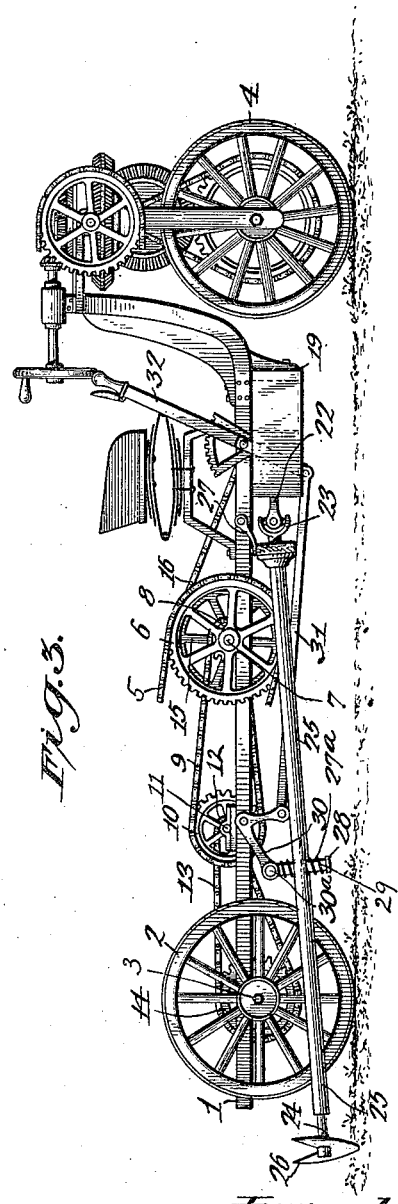

UNITED STATES PATENT OFFICE.

JOSEPH L. PRATHER, OF FRESNO, CALIFORNIA.

PLOW.

1,008,490. Specification of Letters Patent. Patented Nov. 14, 1911.

Application filed September 7, 1909. Serial No. 516,576.

*To all whom it may concern:*

Be it known that I, JOSEPH L. PRATHER, a citizen of the United States, residing at Fresno, in the county of Fresno, State of California, have invented certain new and useful Improvements in Plows; and I do declare the following to be a full, clear, and exact description of the same, such as will enable others skilled in the art to which it appertains to make and use the same, reference being had to the accompanying drawings, and to the characters of reference marked thereon, which form a part of this application.

This invention relates to improvements in farming utensils and paraphernalia and particularly to plows the object of the invention being to produce a plow having a plurality of auger shaped plows adapted to being alined at the rear of the machine proper to be propelled by the motive power whereby they will cut off sections or slices of the earth and throw the same off the plow shares rearwardly whereby the action of the plows will assist the machine in its forward movement and at the same time highly pulverize and cultivate the soil.

A further object of the invention is to produce such a device as will be simple and inexpensive and yet exceedingly effective for the purposes for which it is designed and one which will reduce the time, labor and expense of operation.

These objects, I accomplish by means of such structure and relative arrangement of parts as will fully appear by a perusal of the following specification and claims.

In the drawings similar characters of reference indicate corresponding parts in the several views.

Figure 1 is a top plan view of the complete plow. Fig. 2 is a sectional view of the same taken relatively on a line X—X of Fig. 1. Fig. 3 is a side elevation of the complete device. Figs. 4, 5, 6 and 7 are views of modified forms of plow shares which may be used on my device.

Referring now more particularly to the characters of reference on the drawings 1 designates the frame of the machine supported on rear wheels 2 mounted on the shaft 3 carried by said frame 1 and by a front driving and steering wheel 4.

In practice any suitable motive power may be attached or mounted on the frame 1 this motive means not being shown in the drawing. This motive means would drive a chain 5 which in turn drives a sprocket wheel 6 secured to the shaft 7 mounted on the frame 1 on which shaft is another sprocket wheel 8 and connected by a chain 9 to the sprocket wheel 10 on the shaft 11 mounted on the frame 1 while 12 is another sprocket wheel mounted on the shaft 11 and connected by a chain 13 to the sprocket wheel 14 on the shaft 3 whereby the wheels 2 may be driven by the motive power as aforesaid the gearings and the chains described being so apportioned as to drive the wheels 2 and incidentally the machine at a speed relatively slow in proportion to the speed of the engine. On the shaft 7 is a sprocket wheel 15 driving a chain 16 which in turn drives a sprocket wheel 17 on a shaft 18 in the box 19 below the front of the frame 1. This shaft 18 drives a plurality of beveled gears 20 intermeshing with a plurality of beveled gears 21 on shafts 22 journaled in the box 19 and having at their outer ends universal joints 23 connecting them with shafts 24 projecting through sleeves or tubes 25 projecting beneath the frame 1 and clear of the rear thereof on the outer ends of which shafts 24 are the plow shares 26 which are substantially auger shaped or otherwise as may be desired. The sleeves or tubes 25 are pivoted by links 27 on the frame 1 at their inner ends and are adapted to be raised or lowered by means of a cross bar 28 projecting underneath of said sleeves or tubes 25 and having rods 29 projecting upwardly from each end thereof and connected to toggle cranks 30 connected by rods 31 with an operating lever 32 whereby the sleeves 25 and incidentally the plows 26 on the shafts 24 may be raised and lowered at will. The tubes 25 and incidentally the plow shares 26 are held in normal operating position by means of springs $27^a$ interposed between a cross rod $30^a$ on the member 30 and the said tubes 25.

In operation the plows 2 being auger shaped and disposed in alinement with the rear of the machine cut the earth and throw it rearwardly thus aiding in the forward movement of the machine and also by reason of their alinement with one another cultivate and fertilize the soil as set forth.

I also provide a steering mechanism for my improved plow shown in the drawing but not herewith described for the reason that I have already made specification thereon, in another application for patent.

33, 34, 35 and 36 show my modified improvement of plow shares which may be used in place of the plow shares 2.

While this specification sets forth in detail the present and preferred construction of the device, still in practice such deviations from such detail may be resorted to as do not form a departure from the spirit of the invention.

Having thus described my invention what I claim as new and useful and desire to secure by Letters Patent is:—

1. A plow comprising a wheel mounted frame, a plurality of tubes hinged to the under side of said frame, means for raising and lowering said tubes, such means comprising a cross bar disposed beneath said tubes, rods on the ends of said cross bar and projecting upwardly therefrom, bell cranks mounted on said frame and connected to said vertical rods, an operating lever, means connecting said bell cranks to said operating lever and a plurality of shafts operated through said tubes and carrying plows on their outer ends, said shafts having means for rotating them as described.

2. A plow comprising a wheel mounted frame, a plurality of tubes hinged to said frame and projecting horizontally beneath said frame, a plurality of shafts disposed through said tubes, means for rotating said shafts, a plurality of plow shares on the end of said shafts, springs interposed vertically against said tubes and means for raising and lowering said tubes as described.

JOSEPH L. PRATHER.

Witnesses:
J. G. Rhodes,
M. A. Banick.

---

Copies of this patent may be obtained for five cents each, by addressing the "Commissioner of Patents, Washington, D. C."